United States Patent [19]

Ando et al.

[11] 4,031,323

[45] June 21, 1977

[54] REMOTE CONTROLLABLE TELEPHONE ANSWERING DEVICE HAVING A DUAL PLAYBACK CAPABILITY

[75] Inventors: Shizuo Ando; Akira Okamura, both of Kawagoe, Japan

[73] Assignee: Pioneer Electronic Corporation, Tokyo, Japan

[22] Filed: Mar. 28, 1975

[21] Appl. No.: 563,031

[30] Foreign Application Priority Data

Mar. 29, 1974  Japan .............................. 49-36215

[52] U.S. Cl. ................................................ 179/6 E
[51] Int. Cl.$^2$ ........................................ H04M 1/64
[58] Field of Search .......... 179/6 E, 2 A, 100.1 DR

[56] References Cited

UNITED STATES PATENTS

| | | | |
|---|---|---|---|
| 3,067,289 | 12/1962 | Zimmermann | 179/6 E |
| 3,136,856 | 6/1964 | Zimmermann | 179/6 E |
| 3,757,049 | 9/1973 | Bonsky et al. | 179/6 E |
| 3,867,578 | 2/1975 | Uechi | 179/6 E |
| 3,903,369 | 9/1975 | Darwood | 179/6 E |

*Primary Examiner*—Raymond F. Cardillo, Jr.

*Attorney, Agent, or Firm*—Sughrue, Rothwell, Mion, Zinn & Macpeak

[57] ABSTRACT

A telephone automatic answering device including provision for remotely controlling said device to cause playback of messages and selective rewinding of a message recording tape. The device includes an answer tape on which a prerecorded answer may be placed, and a message tape which receives and reproduces messages left by callers. The subscriber may initiate playback of the message tape by causing a remote signal to be applied over the telephone line. The answering device picks up the remote signal and rewinds the message tape a predetermined amount. The subscriber then hears the recorded messages and knows immediately if it is necessary to rewind the tape an additional amount. If the subscriber wants to rewind the tape an additional amount, he causes the remote signal to be sent again over the telephone line. The message tape then rewinds for the duration of the latter remote signal. Playback occurs immediately following rewinding and stops when the recorded remote signal arrives at the playback head of the message tape.

5 Claims, 1 Drawing Figure

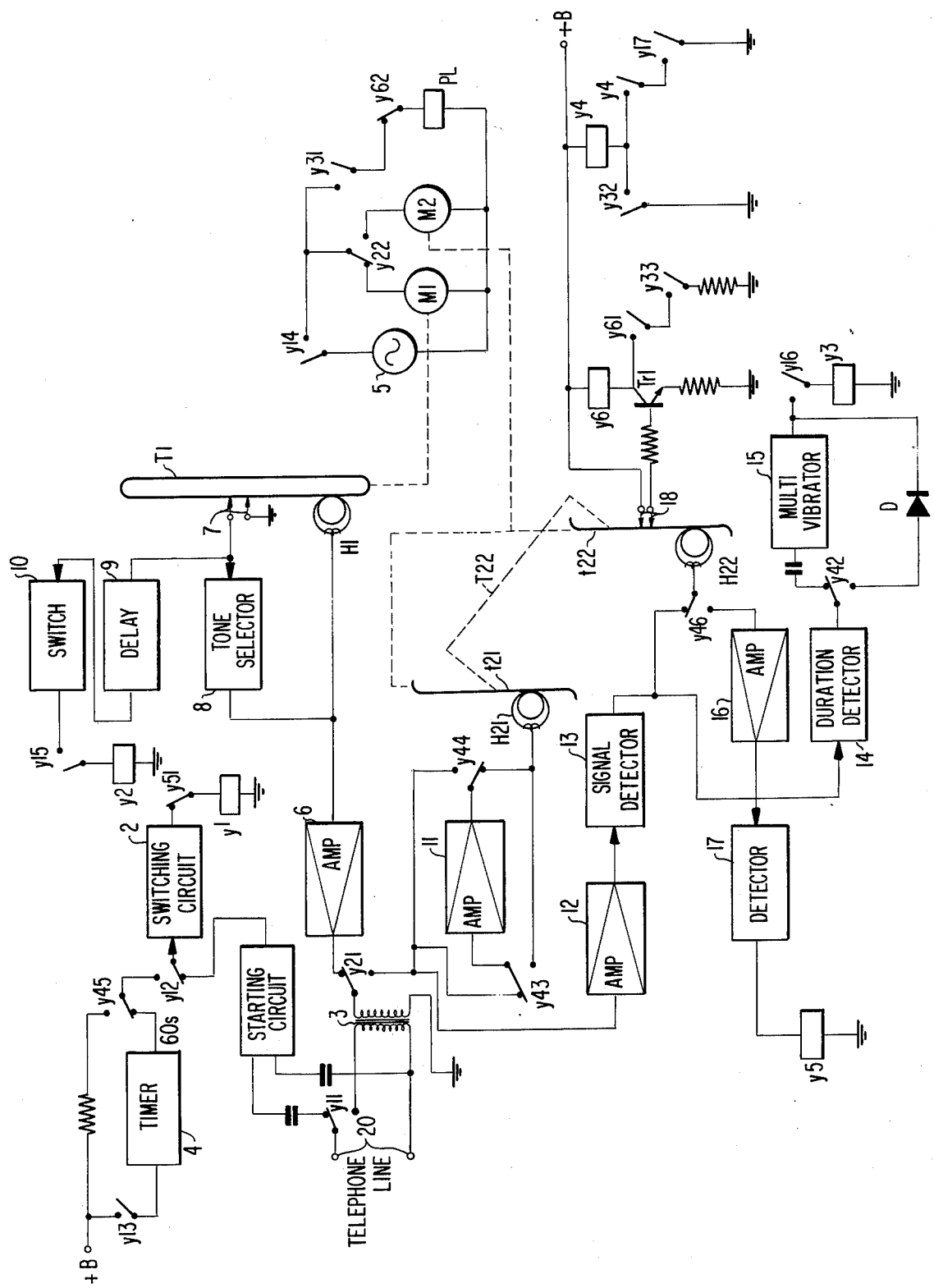

REMOTE CONTROLLABLE TELEPHONE ANSWERING DEVICE HAVING A DUAL PLAYBACK CAPABILITY

BACKGROUND OF THE INVENTION

This invention relates to a telephone automatic answering device which is operable in such a manner that when a calling signal is received over a telephone line, the device places the line in a communicable state, sends out a previously recorded message to the calling subscriber, and then records the subscriber's message on another tape. The invention more specifically relates to a type of automatic telephone answering device which rewinds the latter tape when specific remote control signals are received over a telephone line, and reproduces the message recorded thereon.

It is apparent that the utility of an automatic telephone answering device can be improved by the provision of means for controlling the message recording tape from a remote position, and by provision of a means permitting the subscriber to hear the recorded messages over the telephone line. However, in the conventional remote control device of this type, it has been a common practice to rewind the message recording tape to its initial starting position and to reproduce the recorded messages thereon each time a specific remote control signal is received. Thus, a subscriber who wants to hear the latest messages recorded is obliged to hear all recorded messages, including those already heard.

Furthermore, the conventional remote controlling practice has required a continuous reception of the remote control signal for a comparatively long period, thus occupying the telephone line for the corresponding duration of time.

SUMMARY OF THE INVENTION

A primary object of the present invention is to provide an automatic telephone answering device which permits reproduction of only a required part of the recorded messages on a message tape upon reception of a remote control signal.

Another object of the invention is to provide an automatic telephone answering device which, upon initial reception of a remote control signal, rewinds the message tape a predetermined amount and reproduces the messages on said predetermined amount of tape.

Still another object of the invention is to provide an automatic telephone answering device which can be remotely controlled during message playback to cause rewinding of the message tape any desired amount. The rewinding is caused by and lasts for the duration of a subsequently applied remote signal.

A further object of the invention is to provide an automatic telephone answering device which resets the entire operation automatically when the reproduction due to the second control signal comes to the part previously reproduced by the first remote control signal.

These and other objects of the invention, which will be made apparent herein, can be achieved by an automatic telephone answering device according to the present invention comprising means for reproducing and sending out a previously tape recorded message in response to the reception of a calling signal, means for recording calling subscribers' messages on a message recording tape, means for detecting remote controlling signals received via the telephone line, means for rewinding the message recording tape for a predetermined period after the arrival of a first remote control signal and for reproducing the messages on the tape upon termination of the predetermined period, means for rewinding the message recording tape upon reception of the second remote control signal for a period corresponding to the duration of the second remote control signal and placing the tape in the reproducing state upon termination of the second control signal, means for sending out the reproduced messages over the telephone line, and means for resetting related means when the thus rewound message recording tape has been reproduced at least to a position reproduced by the first remote control signal.

The nature, principle, and utility of the present invention will be more clearly understood from the following detailed description of the invention when read in conjunction with the accompanying drawing.

BRIEF DESCRIPTION OF THE DRAWING

The accompanying single drawing is a block diagram showing a telephone automatic answering device according to the present invention.

DETAILED DESCRIPTION OF THE PREFERRED EMBODIMENTS

Referring to the accompanying single drawing, when a calling signal arrives through a telephone line 20, the signal enters through a contact $y11$ of a relay Y1 into a starting circuit 1. The starting circuit 1 generates a d.c. output a predetermined time (for instance, from 3 to 10 seconds) after the reception of the calling signal. The operational state of a switching circuit 2 is thereby reversed and the relay Y1 is operated through a contact $y51$. Operation of the relay Y1 transfers the contact $y11$ to the side of a line transformer 3 and also transfers six other contacts $y12$ through $y17$. That is, the contact $y12$ interposed between the starting circuit 1 and the switching circuit 2 transfers the input of the switching circuit 2 from the starting circuit 1 to the side connected to a timer 4. The timer 4 which is now connected through the just closed contact $y13$ to a power source generates a d.c. output for a predetermined time (for instance, about 60 seconds) after the closure of the contact $y13$. By the d.c. output, the switching circuit 2 is held in the ON state thereby maintaining the relay Y1 at the operating state.

By the transfer of the contact $y11$ caused by the operation of the relay Y1, the telephone line is held in a communicable state with respect to the answering apparatus. A motor M1 connected through the contacts $y14$ and $y22$ to a power source 5, causes movement of an answering tape T1. The answering tape T1 may be of an endless type having a length adapted to be circulated by one complete turn within 20 seconds when the tape T1 is in a constant running state. A recorded message on tape T1 is reproduced by a magnetic head H1, amplified by a reproduction amplifier 6, and sent out over the telephone line 20 through a hereinafter described contact $y21$ of a relay Y2. An electrically conductive foil (not shown) is positioned on tape T1 to provide, in conjunction with contacts 7, a termination indication when the foil reaches a position to short circuit contacts 7.

When contacts 7 are short circuited, a beep-tone generator 8 is operated, thereby delivering a beep-tone over the telephone line which indicates to the calling subscriber that the system is ready for recording a message. A delay circuit 9 delivers a d.c. output after a predetermined period of, for instance, one to two seconds from the instant when the terminating position of the tape T1 is detected, thereby placing a switching circuit 10 in the ON state and operating the relay Y2 through the contact $y15$ just closed.

The relay Y2 operates two contacts $y21$ and $y22$. Contact $y21$ transfers the secondary of the line transformer 3 from the reproduction amplifier 6 to a record-/reproduction amplifier 11 thereby permitting a message signal from the calling subscriber to be connected to a magnetic head H21. The contact $y22$ disconnects the motor M1 from the power source 5, thereby stopping the answering tape T1, and connects motor M2 to the power source 5. Motor M2 runs message recording tape T2 at a constant speed. The message is then recorded in the first track $t21$ on the tape T2 by the magnetic head H21.

When the preset time in the timer 4 elapses in this state, the input level of the switching circuit 2 is lowered thereby transferring the switching circuit 2 into OFF state and placing the relay Y1 in an inoperative state. In addition, the opening of the contact $y15$ brings the relay Y2 into inoperative state, and all members related thereto are reset to their original states to be ready for the subsequent operation. The above described operation is repeated each time the bell signal arrives, and the message recording tape T2 is in each instance shifted to record the calling subscriber's message in the first track thereof.

In the case where a specific remote control signal is received over the telephone line during the aforementioned recording operation of the message recording tape T2, the remote control signal is not only recorded in the first track $t21$ of the message recording tape T2 as described above, but also amplified in an amplifier 12, detected by a discriminating filter circuit 13, which discriminates against other signals, and is recorded by means of a magnetic head H22 in the second track $t22$ on the message recording tape T2.

Furthermore, a part of the remote control signal passed through the filter circuit 13 is supplied to a confirmation circuit 14. The confirmation circuit 14 is so composed that it delivers a d.c. output only when the duration of the remote control signal exceeds, for instance, two seconds, and this d.c. output is sustained so far as the remote control signal continues. Upon generation of this d.c. output, a pulse is applied to an appropriate timer circuit such as a monostable multivibrator 15 which generates a d.c. output for a preset time period (for instance, 10 seconds) from this instant thereby to energize a relay Y3 through the contact $y16$ now closed. The relay Y3 operates three contacts $y31$ through $y33$, and the closure of the contact $y31$ connects a rewinding clutch or plunger PL for the message recording tape T2 to the power source 5 thereby rewinding the tape T2 for a period preset by multivibrator 15 (for 10 seconds). When Y3 is deenergized, $y31$ opens thereby removing the power supply 5 from plunger PL. Reverse winding of tape T2 ceases, and tape T2 reverts to the forward position whereby messages recorded thereon are reproduced via magnetic head H21. As will be pointed out hereafter, tape T2 may be rewound by more than the predetermined amount at the desire of the person sending the remote control signal. In addition, the closure of the contact $y32$ by the energization of the relay Y3 connects a relay Y4 to the power source of the device, and the relay Y4 is self-held by the now closed contact $y17$ and its own contact $y41$.

Among six contacts $y41$ through $y46$ controlled by the relay Y4, the contact $y42$ separates the output of the confirming circuit 14 from the input of the multivibrator 15 so that the operation thereafter of the multivibrator 15 by the subsequent remote control signal is prevented. The contacts $y43$ and $y44$ transfer connections of the input of the recording/reproducing amplifier 11 to the magnetic head H21 and the output of the same amplifier 11 to the line transformer 3, respectively, whereby the messages recorded in the first track $t21$ of the message recording tape T2 are delivered to the telephone line. The closure of the contact $y45$ transfers the input terminal of the switching circuit 2 from the timer 4 to the power source of the device, so that switching circuit 2 is held in the ON state after the elapse of the present time of the timer circuit 4.

During the progress of the reproduction of the messages, when the message recording tape T2 travels to a position where the remote control signal is first supplied, the remote control signal recorded in the first track $t21$ is sent out over telephone line thereby reporting to the calling subscriber about the fact that the last part of the messages has just been reproduced. Further, the remote control signal recorded in the second track $t22$ is reproduced by the magnetic head H22, and the reproduced signal is sent through the contact $y46$ to the amplifier 16, and switching circuit 17 to operate relay Y5. This opens contact $y51$, thereby deenergizing relay Y1 which results in the device being reset to its initial state.

If the remote control signal is further sent out from the calling subscriber during the time that messages on tape T2 are being reproduced, the remote control signal will operate the relay Y3 through the amplifier 12, filter circuit 13, confirmation circuit 14, contact $y42$, diode D, and the contact $y16$ only for the duration of the remote control signal. The operation of the relay Y3 initiates the rewinding operation of the message recording tape T2 as described hereinbefore. However, since the multivibrator 15 has been bypassed, the duration of the rewinding operation in this case is solely defined by the duration of the remote control signal.

If the message recording tape T2 is rewound completely to its starting position, a pair of contact poles 18 will be shorted by an electrically conductive foil provided at the start end of tape T2. Transistor Tr1 will be turned ON by an increase in the base bias thereby energizing a relay Y6, connected in the collector circuit of transistor Tr1. The operation of the relay Y6 is self-held by its own contact $y61$ and the contact $y33$, now closed. Another contact $y62$ of the relay Y6 separates the tape rewinding plunger PL from the power source, so that further rewinding operation of the tape T2 is prohibited even if subsequent remote control signals are received.

As will be apparent from the above description, when a calling subscriber sends out a remote control signal during the recording operation of the message recording tape T2, the rewinding of the same tape is carried out for a predetermined period regardless of the duration of the remote control signal, and then automatically shifted to the reproducing operation. Thus, it can be easily assured whether the message recording tape T2 includes a new message or not, and this can help much in the judgement as to the necessity for reproducing the required part for a required time or for terminating the inquiry because of no new message being contained. For this reason, the possibility of continuously sending the remote control signal for a long period can be substantially eliminated, and useless occupation of the telephone line and the automatic answering device can be avoided. Further, more, because the first remote control signal is recorded in the second track t22 of the message recording tape T2 and the reproduction of the tape is reset at the recorded position of the control signal thereafter to record subsequent messages, there is no possibility of the already recorded messages being erased in the course of the reproducing operation.

What is claimed is:

1. A remote controllable automatic telephone answering device adapted to be connected to a telephone line, said device comprising; an answer tape, means for reproducing an answer prerecorded on said answer tape and sending out said reproduced answer in response to the reception of a calling signal via said telephone line, a message tape, means for recording callers' messages on said message tape when it is unwinding, means for detecting a remote control signal received via said telephone line, first means for rewinding the message recording tape for a fixed time period in response to a first detection of a first said remote control signal and for reproducing any messages on the thus rewound part of said message tape, said fixed time period being independent of the duration of said remote control signal and independent of the amount of tape unwound, second means responsive to a subsequent detection of a second said remote control signal during the reproducing of said messages for rewinding said message tape for a period corresponding to the duration of the second remote control signal and for reproducing any messages on the part of said message tape thus rewound, and means for sending out said reproduced messages via said telephone line.

2. A device as claimed in claim 1 wherein said first and second remote control signals have the same frequency.

3. A device as claimed in claim 1 wherein said first means comprises rewinding means energizable by a signal applied thereto for rewinding said answer tape for the duration of said applied signal, and monostable multivibrator means normally connected between the output of said detecting means and said rewinding means for applying a signal to said rewinding means for said predetermined period when said detecting means detects said first remote control signal.

4. A device as claimed in claim 3 wherein said second means comprises switching means responsive to the energization of said rewinding means by said monostable multivibrator means for disconnecting said multivibrator means from said output of said detecting means and for connecting said detecting means output to said rewinding means, whereby subsequent outputs from said detecting means energize said rewinding means for the duration of said outputs.

5. A device as claimed in claim 4 further comprising means for recording said received remote signal onto said message tape, and means responsive to the reproduction of a thus recorded remote signal for stopping said message tape and for reconnecting said monostable multivibrator means back to the output of said detecting means.

* * * * *